(12) United States Patent
Akhtar

(10) Patent No.: US 11,761,354 B2
(45) Date of Patent: *Sep. 19, 2023

(54) MECHANICAL/ELECTRICAL POWER GENERATION SYSTEM

(71) Applicant: CEOX TECHNOLOGIES LTD, Leatherhead (GB)

(72) Inventor: Mirza S. Akhtar, Tadworth (GB)

(73) Assignee: CEOX TECHNOLOGIES LTD, Leatherhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,362

(22) Filed: Jan. 14, 2022

(65) Prior Publication Data

US 2022/0136413 A1 May 5, 2022

Related U.S. Application Data

(63) Continuation of application No. 16/610,776, filed as application No. PCT/GB2018/000078 on May 8, 2018, now Pat. No. 11,255,223.

(30) Foreign Application Priority Data

May 5, 2017 (GB) .................................... 1707272

(51) Int. Cl.
  *F01K 23/08* (2006.01)
  *F01K 7/32* (2006.01)
  (Continued)

(52) U.S. Cl.
  CPC ................ *F01K 23/08* (2013.01); *F01K 7/32* (2013.01); *F01K 23/10* (2013.01); *F01K 25/103* (2013.01);
  (Continued)

(58) Field of Classification Search
  CPC .......... F01K 25/103; F01K 7/32; F01K 23/02; F01K 23/06; F01K 23/08; F01K 23/10;
  (Continued)

(56) References Cited

U.S. PATENT DOCUMENTS

| 3,971,211 A | 7/1976 | Wethe et al. |
| 4,498,289 A | 2/1985 | Osgerby |

(Continued)

FOREIGN PATENT DOCUMENTS

| DE | 102013223661 B4 * | 5/2015 | ............. F01K 23/10 |
| WO | 2012040169 A1 | 3/2012 | |
| WO | 2012159189 A1 | 11/2012 | |

OTHER PUBLICATIONS

International Search Report and Written Opinion issued in PCT/GB2018/000078, dated Sep. 10, 2018.

(Continued)

*Primary Examiner* — Mark A Laurenzi
*Assistant Examiner* — Xiaoting Hu
(74) *Attorney, Agent, or Firm* — Hamre, Schumann, Mueller & Larson, P.C.

(57) ABSTRACT

Electrical/mechanical power is derived from oxycombustion of hydrocarbons, preferably LNG, in a first of two nested cycles each operating on a Brayton cycle to provide a source of power, without mixing of working fluids between the two cycles. Each cycle employs $CO_2$ as a working fluid, the first cycle operating under low pressure conditions in which $CO_2$ is sub-critical, and the other cycle operating under higher pressure conditions in which $CO_2$ is supercritical. The first cycle serves as a source of heat for the second cycle by gas/gas heat exchange which cools the products of combustion and circulating working fluid in the first cycle and heats working fluid in the second cycle.

7 Claims, 6 Drawing Sheets

(51) Int. Cl.
    *F01K 25/10* (2006.01)
    *F02C 1/10* (2006.01)
    *F02C 3/34* (2006.01)
    *F02C 1/00* (2006.01)
    *F01K 23/10* (2006.01)

(52) U.S. Cl.
    CPC ............... *F02C 1/007* (2013.01); *F02C 1/10* (2013.01); *F02C 1/105* (2013.01); *F02C 3/34* (2013.01)

(58) Field of Classification Search
    CPC ...... F01K 23/064; F02C 3/34; F02C 3/20–28; F02C 6/203; F02C 1/007; F02C 1/04; F02C 1/05; F02C 1/10; F02C 1/105; F02C 6/00; F02C 6/04; F02C 6/06; F02C 6/10; F02C 6/18
    See application file for complete search history.

(56) References Cited

U.S. PATENT DOCUMENTS

| | | |
|---|---|---|
| 2002/0023423 A1 | 2/2002 | Viteri et al. |
| 2011/0179799 A1 | 7/2011 | Allam et al. |
| 2011/0219780 A1* | 9/2011 | Prabhu ..................... F22B 1/26 |
| | | 60/39.19 |
| 2012/0036860 A1* | 2/2012 | Wettstein ................. F02C 9/26 |
| | | 60/39.511 |
| 2012/0128463 A1 | 5/2012 | Held |
| 2013/0145773 A1 | 6/2013 | Kulkarni et al. |
| 2013/0180259 A1 | 7/2013 | Stapp |
| 2014/0150443 A1 | 6/2014 | Laing et al. |
| 2014/0250911 A1 | 9/2014 | Huntington et al. |
| 2014/0345279 A1 | 11/2014 | Held et al. |
| 2014/0366549 A1 | 12/2014 | Wang et al. |
| 2014/0374109 A1* | 12/2014 | Denton .................... F02C 7/18 |
| | | 166/309 |
| 2015/0240665 A1 | 8/2015 | Stapp |
| 2017/0058712 A1 | 3/2017 | Allam et al. |
| 2019/0024583 A1 | 1/2019 | Lu et al. |
| 2020/0200049 A1 | 6/2020 | Ryu et al. |

OTHER PUBLICATIONS

Rodney J Allam, "Breakthrough that CCS needs", The Power of choice, Jul. 10, 2013, Modern Power Systems, 10 pages provided.
Andersen et al.; "Costs and benefits of LNG as ship fuel for container vessels", published by Germanischer Lloyd SE in 2013, 12 pages provided.
Search Report issued in GB1707272.9, dated Oct. 26, 2018.

* cited by examiner

50 MW – Oxy Combustion Supercritical $CO_2$ Cycle

| Equip No. | HP CYCLE | Pin bar | Pout bar | Tin °C | Tout °C | Mass Flow In kg/s | Mass Flow Out kg/s | Heat/Power MW |
|---|---|---|---|---|---|---|---|---|
| 12 | HP G/G Exchanger | 200-400 | 200-400 | 500-600 | 700-800 | | | |
| 23 | HP Expander | 200-400 | 80 | 700-800 | 500-600 | | | 60-70 |
| 27 | HP Recuperator TOP (HOT) | 80 | 80 | 500-600 | 130-150 | | | |
| 20 | HP/LP Recuperator (HP) | 80 | 80 | 130-150 | 70-80 | 325-350 | | |
| 24 | HP Cooler | 80 | 80 | 70-80 | 40 | | | |
| 26 | HP Compressor | 80 | 240-260 | 40 | 120-140 | | | -(15-20) |
| 27 | HP Recuperator TOP (COLD) | 200-400 | 200-400 | 120-140 | 500-600 | | | |

FIG. 4A

50 MW – Oxy Combustion Supercritical CO$_2$ Cycle

| Equip No. | LP CYCLE | Pin bar | Pout bar | Tin °C | Tout °C | Mass Flow In kg/s | Mass Flow Out kg/s | Heat/Power MW |
|---|---|---|---|---|---|---|---|---|
| 10 | Oxy-Combustor | | 20-30 | | 800-1200 | | 280-310 | -(130-140) |
| 12 | LP G/G Exchanger | 20-30 | 20-30 | 800-1200 | 500-900 | | 280-310 | |
| 13 | T/ expander | 20-30 | 10 | 500-900 | 400-600 | | 280-310 | 25-35 |
| 14 | LP Recuperator (HOT) | 10 | 10 | 400-600 | 150-200 | | 280-310 | |
| 15 | LP Cooler | 10 | 10 | 150-200 | 40 | | 280-310 | |
| 16 | LP Separator | 10 | 10 | 40 | 40 | 280-310 | 270-305 | |
| | H2O production | | | | | 5-10 | | |
| 18 | LP Compressor | 10 | 20-30 | 40 | 110-130 | | 270-305 | -(15-20) |
| 19 | LP Aftercooler | 20-30 | 20-30 | 110-130 | 40 | | 270-305 | |
| 20 | HP/LP Recuperator (LP) | 20-30 | 20-30 | 40 | 120-140 | | 260-300 | |
| 14 | LP Recuperator (COLD) | 20-30 | 20-30 | 120-140 | 400-600 | | 260-300 | |
| | Excess CO2 for Injection or other application | | | | | 5-10 | | |

FIG. 4B

MECHANICAL/ELECTRICAL POWER GENERATION SYSTEM

CROSS-REFERENCE TO RELATED APPLICATIONS

This application is a continuation of U.S. application Ser. No. 16/610,776 filed on Nov. 4, 2019, which is a National Stage application under 35 U.S.C. § 371 of International Application No. PCT/GB2018/000078, having an International Filing Date of May 8, 2018, which is based upon and claims priority from British Patent Application No. 1707272.9 filed on May 5, 2017, the entire disclosures of which are hereby incorporated by reference.

BACKGROUND

This disclosure relates to mechanical and electrical power generation systems.

Power generating systems employing gas turbine cycles which use air as the working medium or steam turbine cycles which use steam as the working medium are well known and mature technologies. They have long been the primary technologies found in electrical power generation, and in marine engines and in aero engines. The primary sources of energy in such cycles will involve either combustion of fossil fuels or nuclear energy generated in a nuclear pile, both of which present major emission or waste disposal problems.

More recently combustion of liquefied natural gas (LNG), which is predominantly methane, has been proposed as a cleaner alternative to diesel or marine gas oil for use as the primary source of energy in marine engines [See: "Costs and benefits of LNG as ship fuel for container vessels", a joint study by Germanischer Lloyd SE and MAN SE Group, Andersen et al, published by Germanischer Lloyd SE in 2013]. The authors concluded that a reduction of 20-25% in $CO_2$ emissions and over 80% reduction in $NO_x$ and $SO_x$ emissions would be feasible.

A novel cycle termed the "Allam cycle" has been proposed by Dr Rodney Allam employing oxycombustion of LNG and using super-critical $CO_2$ as the working medium at very high temperatures and pressures (typically 300 bar and 1150° C. in working fluid passing from the combustion chamber to the turbine) [See: "NET Power's $CO_2$ cycle: the breakthrough that CCS needs", Allam, $10^{th}$ July 2013, Modern Power Systems, and WO 25012/040169]. While designed to generate significant power (250 MW) at a target efficiency of 58.9%, the system is essentially linked to an oil production facility, since excess $CO_2$ resulting from the combustion is primarily intended to be injected into an oil or gas containing formation for recovery of fuel. The very high temperatures and pressures in the system, as well as the fact that turbines and compressors for supercritical $CO_2$ are much smaller than the equivalent turbines and compressors in conventional steam cycles, present technical, material and containment challenges requiring, just in order to put the Allam cycle into use, further innovation in the combustion chambers, heat exchangers, turbines and compressors to be employed so as to be capable of coping with the demands of such high temperatures and pressures. Lack of existing field experience in such equipment and their specifications presents a risk to the scalability of the technology. It is believed that commercialisation has got no further than a proposed small scale 50 MW thermal power pilot plant.

A further problem inherent in the Allam cycle will become clear from FIGS. 1 and 2 of the present drawings which are annotated copies of the corresponding figures taken from the above Allam paper. FIG. 1 is a simplified schematic process diagram, while FIG. 2 is a log pressure versus specific enthalpy diagram for the $CO_2$ working fluid. Supercritical $CO_2$ at a temperature of 1150° C. and a pressure of 300 bar from combustion chamber 1 is expanded in turbine 2 to generate electrical power via a generator driven by the turbine. Following the turbine, the working fluid passes through a recuperator (heat exchanger) 3 which transfers heat to $CO_2$ heading back to the combustion chamber. After exiting the heat exchanger 3, the turbine exhaust flow is cooled to near atmospheric temperature so that water may be condensed and separated from the cooled stream at 4. The remaining working fluid is compressed at 5 in two stages and then pumped at 6 back to the other side of the heat exchanger 3 before passing to the combustion chamber 1 for a further cycle. However, the system has insufficient heat input, and requires additional heat 7 from some other source. Dr Allam suggests that this additional heat may be provided either from waste heat in an allied air separation unit ASU deriving oxygen from air for use in the oxycombustor, or from a commercially available coal gasifier in a derivative NET Power coal cycle, which latter option would appear to run counter to claims made for the Allam cycle that it avoids emissions. This requirement for an additional heat source to be available means that the Allam cycle cannot readily be employed as a self-contained power plant adapted to provide all of the mechanical and electrical power requirements, for example on a container ship or on an isolated oil production platform.

SUMMARY OF THE DISCLOSURE

The present disclosure adopts a different approach which gains the high power density and small size benefits inherent in the use of $CO_2$ as working fluid, while avoiding the need for additional heat from an external source. As will become clearer from the detailed description given below of a preferred embodiment, it is also possible to construct practical embodiments of apparatus in accordance with the present teachings without going outside the realms of existing technology, and avoiding the very high temperatures and pressures essential for the Allam cycle.

In accordance with a first aspect of this disclosure, there is provided a power production method comprising operating first and second nested cycles utilising $CO_2$ as working fluid without mixing of working fluid between the nested cycles, the first cycle comprising a semi-open loop operating under low pressure conditions in which $CO_2$ is sub-critical, and the second cycle comprising a closed loop operating under higher pressure conditions in which $CO_2$ is supercritical; the first cycle operating in a Brayton cycle including oxycombustion of hydrocarbons, preferably LNG, in a combustion chamber under low pressure conditions, expansion for power production to provide a first power source, cooling in a recuperator, compression, reheating by counter-current passage via the said recuperator, and return of working fluid heated by the recuperator back to the combustion chamber; water and excess $CO_2$ resulting from said oxycombustion being separated from the first cycle; the first cycle serving as a source of heat for the second cycle by gas/gas heat exchange in a gas/gas heat exchanger which results in cooling of the products of combustion and circulating working fluid in the first cycle and heating of working fluid in said second cycle; the second cycle operating in a Brayton cycle including heating of working fluid in the second cycle by the said gas/gas heat exchanger, expansion for power generation to provide a second power source, cooling in two-stages by first and second recuperator steps, compression, reheating by counter-current passage via the first recuperator step, and return of working fluid heated by the first recuperator step back to the gas/gas heat exchanger; and working fluid in the first cycle following said compression step being heated by working fluid in the second cycle by counter-current passage via the second recuperator step.

In a second and alternative aspect of the present disclosure, we provide apparatus adapted to provide mechanical/electrical power in first and second nested cycles utilising $CO_2$ as working fluid without mixing of working fluid between the nested cycles, the first cycle operating under low pressure conditions in which $CO_2$ is sub-critical, and the second cycle operating under higher pressure conditions in which $CO_2$ is supercritical; the apparatus comprising: first apparatus coupled to provide the first cycle and including a combustion chamber adapted to burn hydrocarbons, preferably LNG, in oxygen under low pressure conditions, at least one first turbine adapted to expand the working fluid including products of combustion to provide a first power source, a first recuperator for cooling expanded fluid from the first turbine, a first compressor, first fluid couplings for returning working fluid from the first compressor to the combustion chamber via counter-current passage through the said first recuperator, and separators for removing water and excess $CO_2$ from the first cycle; a gas/gas heat exchanger adapted to cool products of combustion and working fluid in said first cycle, and adapted to serve as a source of heat for the second cycle by gas/gas heat exchange with the said products of combustion and working fluid in the first cycle; and second apparatus coupled to the gas/gas heat exchanger to provide the second cycle and including a second turbine adapted to expand heated second cycle working fluid from the gas/gas heat exchanger to provide a second power source, a two-stage recuperator apparatus for cooling expanded working fluid from the second turbine in a first stage recuperator and subsequently in a second stage recuperator, a second compressor receiving working fluid from the two-stage recuperator apparatus, and second fluid couplings for returning working fluid in said second cycle from the second compressor to the gas/gas heat exchanger via counter-current flow through the first stage recuperator thereby to be heated; and the first fluid couplings being coupled to the second stage recuperator to heat working fluid in the first cycle prior to further heating thereof in the first recuperator.

Preferred embodiments have one or more of the following features: Cooling of the products of combustion and working fluid in said first cycle occurs prior to said expansion step. There is a single first turbine with the gas/gas heat exchanger being positioned upstream of the first turbine. Alternatively, in less preferred arrangements, either the first turbine is upstream of the gas/gas heat exchanger, or there are a plurality of first turbines, at least one of which is positioned upstream of the gas/gas heat exchanger. These alternative arrangements are less preferred since a turbine upstream of the gas/gas heat exchanger would need to be specially constructed from expensive alloys that can withstand the high temperature of gases directly from the combustion chamber and/or would require blade cooling.

Preferred embodiments have one or more of the following features: Working fluid, including products of combustion, cooled in the first recuperator in the first cycle is further cooled in a cooler condenser before passing to a water separator to separate condensed water from the remaining gaseous working fluid which then passes to the first compressor. If pure methane is employed as fuel in the combustion chamber, given further purification, such separated water could provide a source of potable water. The maximum temperature of working fluid in the second cycle is no greater than 800° C., and the maximum pressure in the second cycle is no greater than 400 bar. The maximum temperature of working fluid in the second cycle is between 700° C. and 800° C. and the maximum pressure in the second cycle is between 200 and 400 bar. The maximum pressure in the first cycle is no greater than 30 bar. The maximum pressure in the first cycle is between 20 and 30 bar. Excess $CO_2$ is removed from the first cycle downstream of the first compressor and available for storage or sequestration, if necessary after boosting, or for other applications. The system is emission free. The apparatus provides a self-contained power system for use in a marine vessel, one of the first and second power sources providing mechanical drive to propel the vessel and the other providing electricity for the vessel, and the separated water being treatable to provide a source of potable water for the vessel. The apparatus provides a self-contained power system for an isolated oil or gas well drilling facility, one of the first and second power sources providing mechanical drive to propel a drill and the other providing electricity for the facility, and the separated water being treatable to provide a source of potable water for the facility. The apparatus provides a self-contained power system for an isolated oil or gas production facility, the separated water being treatable to provide a source of potable water for the facility, and removed excess $CO_2$ serving as a source of $CO_2$ for injection into the ground for enhanced oil or gas recovery or for $CO_2$ sequestration. The apparatus provides a self-contained power system for a chemical or petrochemical plant or refinery, removed excess $CO_2$ serving as a $CO_2$ source for process use or for sequestration, separated water serving as a water source for process use or being treatable to provide a source of potable water for the plant or refinery, and excess heat serving as a source of heat for process use.

BRIEF DESCRIPTION OF THE DRAWINGS

Reference will now be made to the accompanying drawings, by way of example only, in which:

FIG. 4 is a table in two parts showing a power balance calculation with computed values derived from a computer simulation of the system of FIG. 3, FIG. 4a showing the calculated values for the high pressure second cycle, and FIG. 4b showing similar values for the low pressure first cycle.

DESCRIPTION OF PREFERRED EMBODIMENTS

Figure 1:
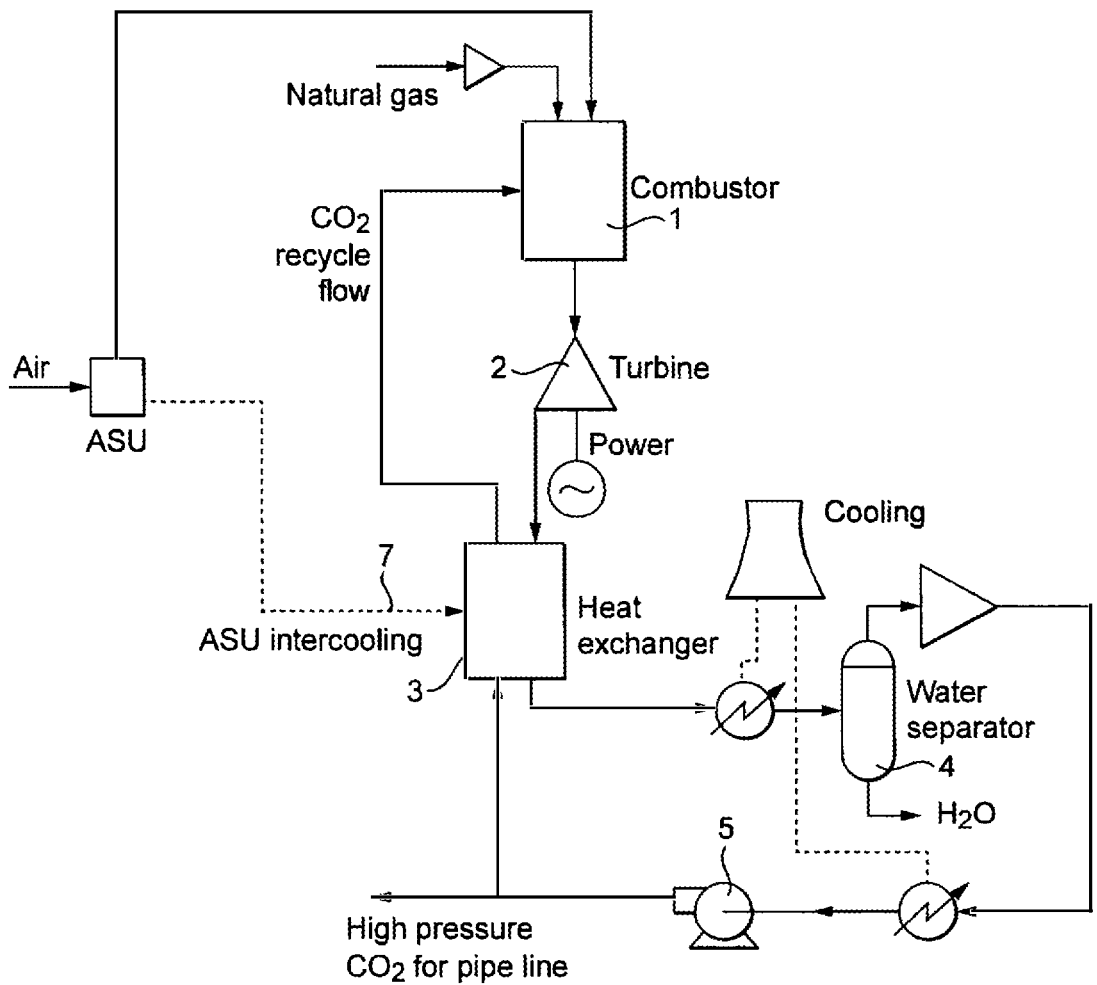
FIGS. 1 and 2 are the aforesaid annotated version of Figures taken from the Allam paper.
Figure 2:
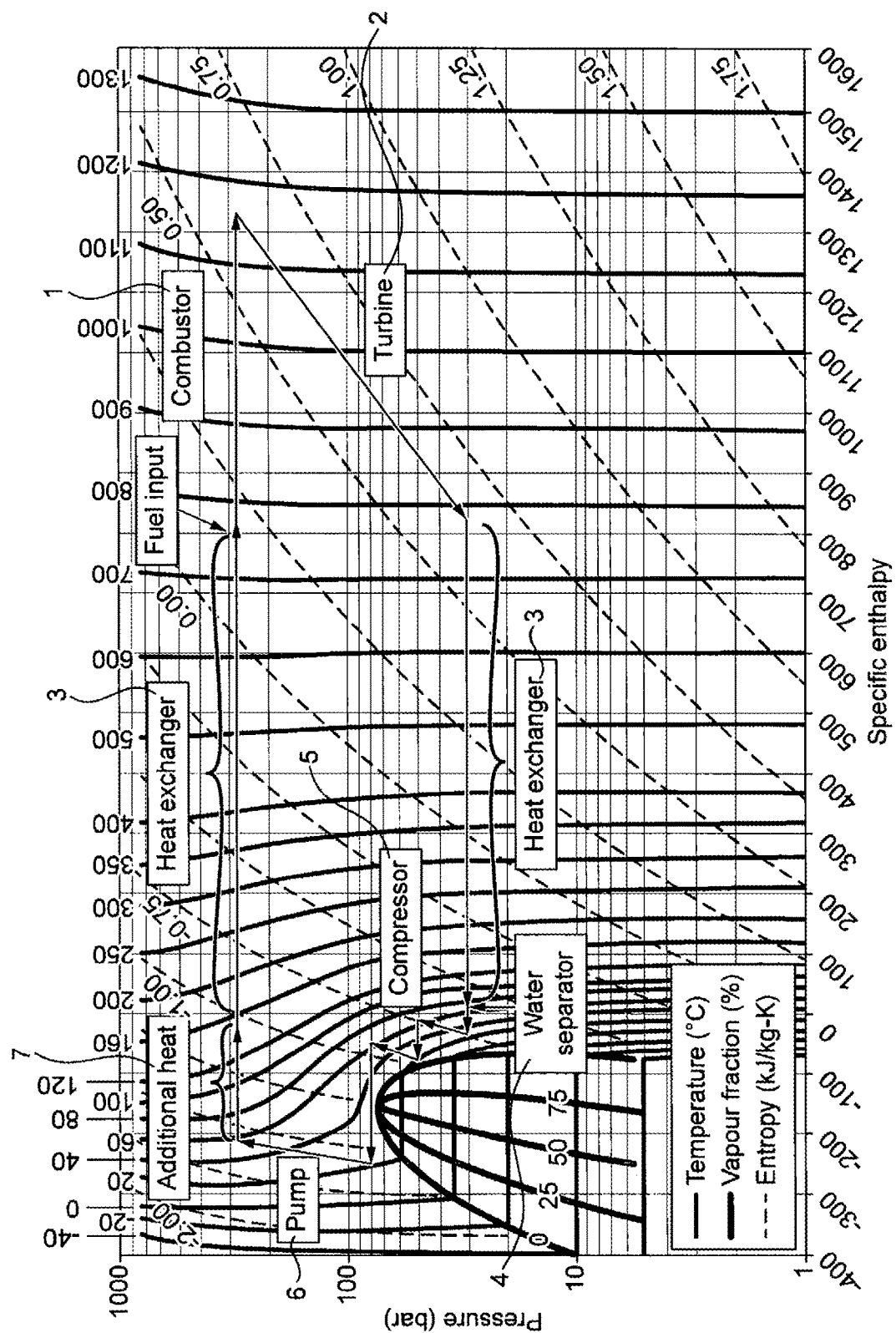
Figure 3:
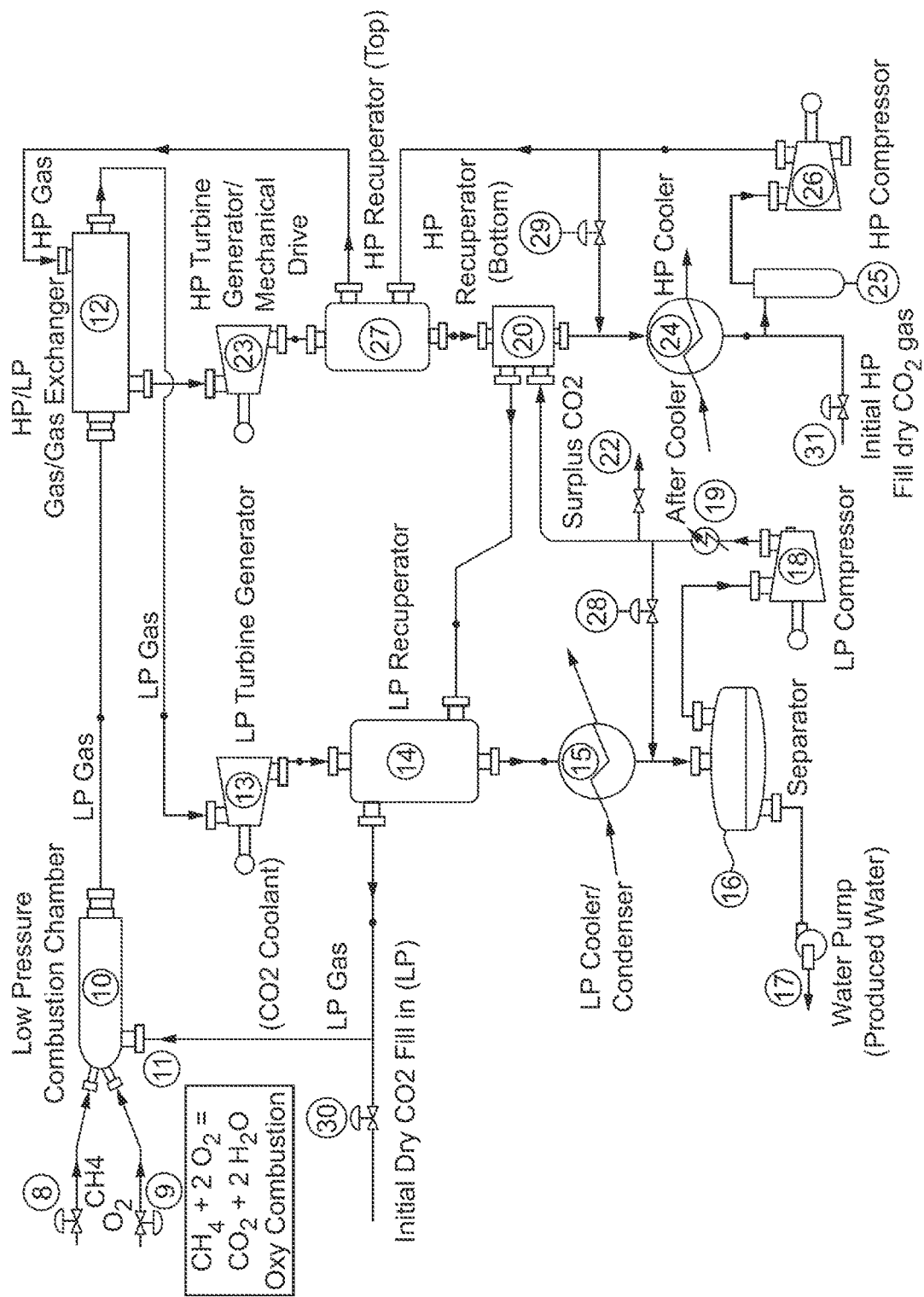
FIG. 3 is a generally schematic circuit diagram of a self-contained power generation system in accordance with the present teachings.

Power generation systems of the kind schematically illustrated in FIG. 3 are designed for a variety of self-contained applications where prime movers are needed, providing between 30 MW and 80 MW with thermal efficiencies in the range of 30-40%. Typical such applications may include, but are not limited to: oil and gas separation, production and export; well-head compression of gas and condensate, and export; gas injection into oil and gas reservoirs to maintain and increase oil recovery; gas pipelines; petro-chemical plants and refineries; LNG production systems that require 200-300 MW of power, but currently use multiple smaller units of 40-50 MW steam/gas turbines to substitute for such smaller units; marine use, particularly in ship power/propulsion systems fuelled by LNG; and in mining activities that require 50-250 MW generation of power.

Typical figures for temperature and pressure given below are derived from NIST (National Institute of Standards and Technology) and validated using process modelling and computer simulations.

Referring to FIG. 3, LNG, essentially methane, $CH_4$, and oxygen, suitably derived by evaporation in an air liquefaction and evaporation separation plant, are supplied at respective inlets 8, 9 to low pressure combustion chamber 10 in a first cycle, to which chamber recirculating $CO_2$ gas is also supplied at inlet 11, for oxy-combustion

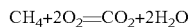
$$CH_4 + 2O_2 = CO_2 + 2H_2O$$

The use of oxygen, rather than air, and the use of LNG as fuel provide clean and complete combustion to $CO_2$ and water with minimal production of undesirable $NO_x$ and $SO_x$ pollutants. The combustion requires the significant quantities of $CO_2$ provided by recirculation of the working fluid in the first cycle to cool the flame temperature so that combustion is conducted within the conventional bounds of existing materials and technology. Such use of $CO_2$ in sub-critical low pressure combustion, typically at 20-30 bar, means that commercially available combustion chambers using generally available materials may be employed. The working fluid and products of combustion typically exit the combustion chamber at 20-30 bar and 800-1200° C. This high temperature low pressure gas passes in the first cycle to a gas/gas heat exchanger 12 which is also included in a second high pressure cycle discussed below. It should be noted that there is no mixing between working fluid in the two cycles.

Approximately 70% of the heat content of the combustion gases is transferred to high pressure working fluid in the second cycle through heat exchanger 12. Low pressure working fluid in the first cycle exiting the heat exchanger 12 passes to a low pressure expander in the form of first turbine 13 and is still at a relatively high temperature of 500-900° C. (more preferably 500-750° C.) with sufficient energy to allow the first turbine 13 to extract a useful quantity of power.

Alternatively, the turbine 13 could be positioned before the heat exchanger 12, or there may be a plurality of first turbines 13 which may operate in parallel, or serially, and at least one of which may be positioned before the heat exchanger 12. Arrangements in which the or a turbine 13 is positioned upstream of the heat exchanger 12 are less preferred, as such turbine would need to be specially constructed from alloys capable of withstanding the high temperatures of gases directly from the combustion chamber and/or would require blade cooling.

In the illustrated embodiment, fluid from the first turbine is first cooled by a first recuperator 14 which transfers heat to recirculating $CO_2$ passing back to the combustion chamber 10, and then by a cooler 15, typically to a temperature of 20-60° C. so that water condenses into liquid water which is separated in separator 16, from which separator produced water is removed by water pump 17 to provide a treatable source for a potable water supply. The remaining $CO_2$ gas, typically at 10 bar and 20-60° C., passes to first compressor 18 where it is compressed to 20-30 bar and 110-130° C., passes through an after cooler 19 where it is cooled to 20-60° C. before being reheated, firstly to 120-140° C. in a second stage 20 of a two-stage recuperator 21 included in the high pressure second cycle and discussed below, and then in first recuperator 14 as mentioned above, from which it emerges at 20-30 bar and 400-600° C. before passing in recirculation to combustion chamber 10. Excess $CO_2$ is withdrawn from the first cycle at 22 downstream of the first compressor 18 and after cooler 19.

Practical embodiments of first turbine 13 and first compressor 18 may be relatively compact and lightweight as compared with typical gas or steam turbines or large diesel engines. For example a range of turbomachinery rotors are available from equipment manufacturers that currently supply high pressure gas compressors which can attain the pressures from 10-30 bar to 400 bar envisaged in practical embodiments of the present process and also mechanical drive steam turbines that are built to withstand 150 bar and 600° C. Suitable such equipment is listed in Compression Technology Sourcing Supplement, published March 2017 by Diesel & Gas Turbine Publications, Waukesha, Wis. 53186-1873, United States of America. Conventional industrial heavy duty gas turbines are designed and manufactured to higher temperatures than envisaged in the present process but the pressures are limited to 30 bar, namely pressures of the order of the maximum pressures envisaged in the first low pressure cycle in practical embodiments of the present process.

The second cycle uses $CO_2$ as working fluid in an essentially closed cycle at high pressure at which the $CO_2$ is in a supercritical state. At the critical pressure of 73 bar and a temperature of 35° C. $CO_2$ becomes super dense and behaves more like a liquid than a gas, and requires greatly reduced compression power. Supercritical $CO_2$ above this temperature and pressure has a very high density and specific heat more like a liquid than a gas. As explained above, the combustion products in the first cycle serve as heat source for the second cycle at gas/gas heat exchanger 12 from which the supercritical $CO_2$ emerges at 200-400 bar and 700-800° C., passing to second turbine 23. Because the second cycle operates under high pressure conditions in which the $CO_2$ is supercritical, the bulk of the power produced in the system as a whole is generated by expansion in second turbine 23. The working fluid emerges from second turbine 23 at 80 bar and 500-600° C., and is cooled in two-stage recuperator 21 and a further cooler 24 before passing via a KO drum 25, to condense any liquid droplets that might be present, to second compressor 26. The two stage recuperator 21 includes a first stage 27 in which working fluid in the second cycle returning to the gas/gas heat exchanger 12 is heated, emerging at 200-400 bar and 500-600° C., having been heated by expanded working fluid from the second turbine 23. Working fluid from second turbine 23 emerges from the first stage 27 of the recuperator at 80 bar and 130-150° C. and is further cooled to 70-80° C. in the second stage 20 of the recuperator, where heat is transferred to low pressure working fluid in the first cycle passing from the first compressor 18 back towards the combustion chamber 10, as explained above. Cooler 24 further reduces the working fluid in the second cycle to a temperature of 40° C. at 80 bar.

The system described lends itself to variation for specific needs. For example, for ship propulsion systems, the high pressure gas flow from the gas/gas heat exchanger can be split into two streams passing to parallel expander turbines. One may be used to generate electrical power by running at constant speed. The other may be run at varying speeds to drive the ship propulsion system.

The proposed compressors are small and compact and may suitably be of the centrifugal type. In view of this, it will be seen that the respective compressors of FIG. 3 are fitted with anti-surge valves 28 and 29 both to protect against surges and to serve as bypass valves on start up.

Provision is made at 30 and 31 respectively to fill the first low pressure cycle and the second high pressure cycle with dry $CO_2$ at start up.

As the maximum temperature of working fluid in the second cycle in the FIG. 3 arrangement is preferably kept below 800° C., the components in the system can be fabricated from conventional commercially available materials, including compressor and turbine components of the kind available from suppliers listed in the aforementioned Compression Technology Sourcing Supplement.

Embodiments of the nested first and second $CO_2$ cycles described above can achieve net efficiencies of over 40%, which is higher than for conventional steam or gas turbine systems while being much lighter and occupying significantly less space than conventional steam or gas turbine power generation systems. Moreover, they can do so without needing to rely upon the extreme temperatures and pressures necessary for the Allam cycle to achieve its claimed efficiencies, as a result of which proven and readily available materials and readily available components can be employed.

Figure 5:
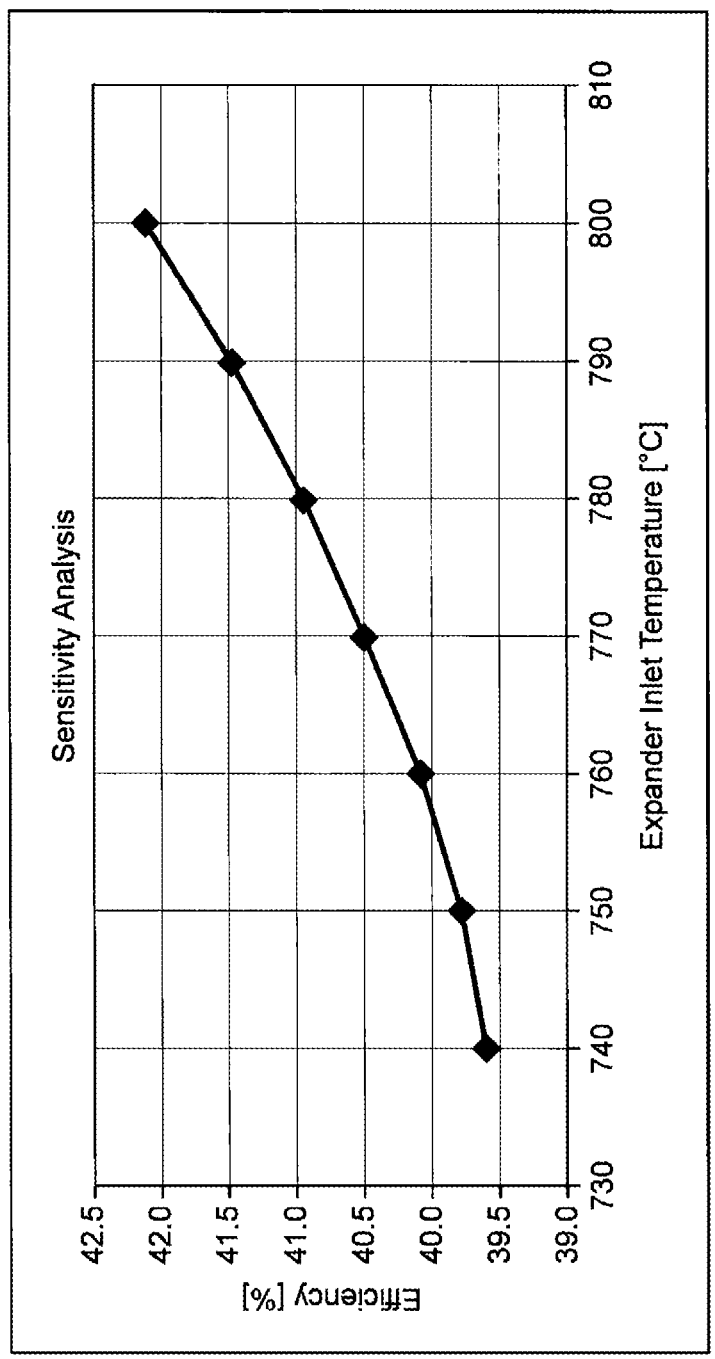
FIG. 5 shows calculated variation in net efficiency with inlet temperature to the second turbine in the high pressure second cycle.

FIG. 5 shows an example of how efficiency can be affected by changing other parameters. Raising or lowering the inlet temperature to the second turbine 23 which acts as expander in the second cycle affects efficiency, as shown in FIG. 5. The values shown are the results of computational simulations.

The small weight and space requirements for practical embodiments of our system that can produce 50 MW of power by clean combustion without emissions and at a net efficiency of around 40% make the system especially suitable for powering marine vessels or for use on isolated oil or gas platforms. The turbomachinery required for the high pressure cycle in a practical embodiment of 50 MW power system in accordance with the present teachings may be very compact by virtue of employing supercritical $CO_2$ and so may have a bulk no greater than that of a conventional cargo container. That required for the low pressure cycle would be greater, but with suitable design and optimisation of equipment, considerable saving in weight and space overall may be achieved by practical embodiments of power system of the kind described herein, as compared with conventional steam turbines used to power container ships and bulk oil or LNG bulk carriers. Such savings may be utilised to increase the payload carried, making operation more profitable. On an isolated oil or gas platform, space is always at a premium.

The invention claimed is:

1. A method of providing electrical/mechanical power derived from oxycombustion of hydrocarbons, the method comprising:
operating a first cycle, which includes a combustion chamber for said oxycombustion of hydrocarbons, the first cycle using $CO_2$ as a working fluid, wherein the first cycle is operated under low pressure conditions in which the $CO_2$ is sub-critical;
operating a second cycle that uses $CO_2$ as a working fluid, wherein the second cycle is operated under higher pressure conditions in which the $CO_2$ is supercritical, wherein the first cycle and the second cycle are nested cycles each operating on a Brayton cycle to provide a source of electrical/mechanical power, without mixing of working fluids between the first cycle and the second cycle, and the first cycle is configured to serve as a source of heat for the second cycle by gas/gas heat exchange which cools products of combustion and the working fluid circulating in the first cycle and heats the working fluid in the second cycle,
wherein the working fluid in the first cycle returning to the combustion chamber is heated firstly by the working fluid in the second cycle by counter-current passage in a first recuperator, and then by counter-current passage in a second recuperator with working fluid in the first cycle expanded after an expansion step in the first cycle.

2. The method according to claim 1, wherein said step of cooling of the products of combustion and working fluid in said first cycle occurs prior to the expansion step in the Brayton cycle of the first cycle.

3. A power plant operatively providing mechanical/electrical power, the power plant comprising:
a first apparatus coupled in a first Brayton cycle using $CO_2$ under low pressure conditions in which $CO_2$ is sub-critical as working fluid, and
a second apparatus coupled in a second Brayton cycle using $CO_2$ in high pressure conditions in which $CO_2$ is super-critical as working fluid;
the first apparatus being nested with the second apparatus without any mixing of working fluid between the first Brayton cycle and the second Brayton cycle;
the first apparatus including a combustion chamber, serving as a sole source of energy to the power plant, the combustion chamber being adapted to burn hydrocarbons in oxygen under low pressure conditions; and
the power plant further comprising a heat exchanger in which products of combustion from the combustion chamber and the working fluid circulating in the first cycle are cooled and the working fluid circulating in the second cycle is heated,
wherein the first cycle serves as a source of power for the second cycle, and
wherein the working fluid in the first cycle returning to the combustion chamber is heated firstly by the working fluid in the second cycle by counter-current passage in a first recuperator, and then by counter-current passage in a second recuperator with working fluid in the first cycle expanded after an expansion step in that first cycle.

4. A marine vessel provided with the power plant according to claim 3, wherein one of the first apparatus and the second apparatus is adapted to provide mechanical drive to propel the vessel and the other is adapted to provide electricity for the vessel, the first apparatus optionally further comprising separation and treatment apparatus for water in the products of combustion in the first apparatus to provide a source of potable water for the vessel.

5. An oil or gas well drilling facility comprising a drill and the power plant according to claim 3, wherein one of the first apparatus and the second apparatus is adapted to provide mechanical drive to propel the drill and the other is adapted to provide electricity for the facility, the first apparatus optionally further comprising separation and treatment apparatus for treating water in the products of combustion to provide a source of potable water for the facility.

6. The facility according to claim 5, wherein the first apparatus further comprises removal and injection means adapted to remove excess $CO_2$ from the first cycle and to inject it into the ground for enhanced oil or gas recovery or for $CO_2$ sequestration.

7. A chemical or petrochemical plant or refinery, provided with an integrated self-contained power system comprising the power plant according to claim 3, wherein excess $CO_2$ is removed from the first apparatus to serves as a $CO_2$ source for process use or for sequestration, water is separated from the first apparatus to serve as a water source for process use or for treatment to provide a source of potable water for the plant or refinery, and excess heat from the first and/or second apparatus serves as a source of heat for process use.

\* \* \* \* \*